United States Patent Office 3,481,910
Patented Dec. 2, 1969

3,481,910
REACTION PRODUCTS OF UNSATURATED DI-
CARBOXYLIC ACIDS, ANHYDRIDES, ESTERS
WITH DEGRADED POLY - ALPHA - OLEFIN
POLYMERS
Marion O. Brunson, Kingsport, Tenn., assignor to Eastman Kodak Company, Rochester, N.Y., a corporation of New Jersey
No Drawing. Filed Oct. 4, 1965, Ser. No. 492,849
Int. Cl. C08f 27/00, 27/28
U.S. Cl. 260—78.4     15 Claims

ABSTRACT OF THE DISCLOSURE

A process for making emulsifiable polyolefins by reacting thermally degraded polypropylene and higher alpha-olefins with an unsaturated polycarboxylic compound.

This invention relates to modified poly-$\alpha$-olefin polymers having improved physical properties and the process for preparation thereof. One of the aspects of this invention concerns novel emulsifiable low molecular weight poly-$\alpha$-olefins compositions. Another aspect of this invention concerns the reaction product of thermally degraded poly-$\alpha$-olefins and unsaturated polycarboxylic acid compounds.

It is known in the art to react poly-$\alpha$-olefins compounds with polycarboxylic compounds. However, the teachings of the prior art are directed to forming higher molecular weight materials which may be more readily fabricated into shaped articles. These shaped articles may then be crosslinked under relatively mild conditions into high molecular weight plastics which are tougher than the uncured plastics. One such prior art teaching is directed to forming high molecular weight poly-ethylene compositions by reacting polyethylene having a density of from .91 to about .96 with maleic anhydride. These compositions have a higher molecular weight and are less soluble than the unmodified polymeric material. Such prior art teachings therefore are directed to forming higher molecular weight polyethylenes having low softening points.

Accordingly, it is one of the objects of the present invention to provide new and improved poly-$\alpha$-olefin compositions having improved physical properties.

Another object of this invention is to provide poly-$\alpha$-olefin compositions having softening points.

A further object of the invention is to provide an emulsifiable poly-$\alpha$-olefin composition.

Still another object of the invention is to form low molecular weight crystallizable poly-$\alpha$-olefin compositions exhibiting high hardness properties.

A still further object of this invention is to improve the emulsifiability of unemulsifiable poly-$\alpha$-olefin compositions by reacting the unemulsifiable compound with unsaturated poly-carboxylic compounds without a substantial increase in inherent viscosity of the unemulsifiable compound.

Another object is to increase the emulsifiability of poly-$\alpha$-olefin compounds without a substantial increase in molecular weight of the unemulsifiable compound.

A further object is to provide the emulsifiability of unemulsifiable poly-$\alpha$-olefin compounds by reacting with polycarboxylic compounds to prepare a reaction product having substantially the same inherent viscosity as the unemulsifiable compound.

Another and still further object of this invention is to provide novel low molecular weight poly-$\alpha$-olefin compositions affording a complete spectrum of useful purposes.

Further objects and advantages of the invention will be apparent to those skilled in the art from the accompanying disclosure and claims.

In accordance with this invention, it has been found that thermally degraded homopolymers of alpha-monoolefins containing 3 to 12 carbon atoms and copolymers thereof can be modified to produce polymers having improved physical and chemical properties by treating such thermally degraded homopolymers or copolymers with an organic unsaturated polycarboxylic acid or an acid anhydride or an acid ester derived therefrom. These modified polymeric materials are therefore of low molecular weight and emulsifiable in aqueous mediums.

This invention therefore is a two step process for preparing modified poly-$\alpha$-olefin compositions of monoolefins containing 3 to 12 carbon atoms. Hence, the thermally degraded homopolymers and copolymers of propylene, butene-1, 4-methyl-1-pentene, 3-methyl-1-butene, 4,4-dimethyl-1-pentene, 3-methyl pentene-1, 4-methyl hexene-1, 5-ethyl hexene-1, 6-methyl heptene-1, hexene-1, heptene-1, octene-1, nonene-1, decene-1, and the like have been found to produce novel compositions when reacted with unsaturated organic polycarboxylic acids or an acid anhydride or an acid ester derived therefrom, as more fully described hereinafter.

The novel poly-$\alpha$-olefin compositions of this invention are prepared by: (1) thermally degrading crystallizable homopolymers or copolymeric poly-$\alpha$-olefin compositions of monoolefins containing 3–12 carbon atoms and (2) reacting the thermally degraded polymer with an unsaturated polycarboxylic acid, anhydrides or esters thereof. These homopolymeric or copolymeric crystallizable poly-$\alpha$-olefins are prepared by conventional polymerization processes for preparing polymeric materials. For example, one such suitable polymer is the highly crystalline polypropylene prepared according to U.S. Patent 2,969,-345. Thermal degradation of these homopolymers or copolymers is accomplished by heating them at elevated temperatures and rupture of the polymer chain apparently takes place at the points of chain branching of the polymeric material. The degree of degradation is controlled by reaction time and temperature to give a thermally degraded low molecular weight crystallizable polymeric material having a melt viscosity range from 250–5,000 cp. at 190° C. (ASTM–D1238–57T using .04±.0002 inch orifice) and an inherent viscosity of about .1 to .5. [Schulken and Sparks, Journal Polymer Science 26 227, (1957).] By carefully controlling the time, temperature and agitation, a thermally degraded poly-$\alpha$-olefin of relatively narrower molecular weight range than the starting high molecular weight polymer is obtained. The degradation is carried out at a temperature from 290° to about 425° C. These thermally degraded products are not emulsifiable as such, but upon reacting them with unsaturated polycarboxylic acids, anhydrides or esters thereof, thereby increasing the acid number and saponification number of the thermally degraded polymer, makes them emulsifiable.

The poly-$\alpha$-olefin high molecular weight polymers which are useful for purposes of this invention and may be degraded are characterized by an ultimate crystallizability of at least 80%. The carbon chains in these polymers appear to be substantially completely symmetrical in all planes. However, methods for determining the exact stereochemical nature or conformation of the asymmetric atoms in the chains of a given type of propylene polymer do not now exist. X-ray diffraction procedures, although useful in studies in the crystallographic unit cell structure and in estimating the degree of crystallinity, do not provide a means for establishing the steric structures of the polymer molecules or for determining their ultimate crystallizability. X-ray methods cannot be used to determine ultimate crystallizability because these methods fail to measure the contribution of small and imperfect crystallinities. The degree of crystallinity of a polymer has no significance per se as a measure of stereosymmetry in the polymer molecules. The degree of crystallinity of a given polymer varies with the thermal history or with the chemical environment to which the polymer is exposed. Therefore, we speak of a polymer as having an ultimate crystallizability. We determine this ultimate crystallizability by means of a thermodynamic method which measures the limiting melting point of the polymer. The (propylene) polymer of this invention having, as it does, as limiting melting point of 180° C., more preferably 183° C. or higher has a remarkably high crystallinity (in terms of ultimate crystallizability) of about 80%. The process by which these highly crystalline propylene polymers are produced yields no products containing more than 20% by weight of heptane-extractable material. Those products which contain as much as 20% by weight of heptane-extractable material generally show a limiting melting point of about 177° C. as the result of a depression in the limiting melting point of the highly crystalline polymer present as a consequence of a mixed melting point effect. In fact, polypropylene polymers containing in excess of 99.5% of the heptane-insoluble polymer are obtainable directly from the reactor using the polymerization procedures set forth hereinafter. Crystallinity as used herein denotes the heptane-insoluble fraction of a propylene polymer expressed in weight percent, said heptane-insoluble fraction being the highly crystallizable polymer described hereinabove.

The thermally degraded poly-α-olefins are reacted with unsaturated polycarboxylic acids, anhydrides or esters thereof at temperatures above 200° C. in the absence of oxygen or catalyst. The reaction may be carried out in a suitable melt atmosphere, such as nitrogen, but pressure is not necessary for carrying out the invention. Reaction time is dependent on temperature and may vary between 15 minutes and four hours. Suitable unsaturated polycarboxylic acids anhydrides and esters thereof for reacting with the thermally degraded polymers are, for example, maleic acid, maleic anhydride, fumaric acid, citraconic anhydride, aconitic anhydride, itaconic anhydride, dimethyl maleate, dimethyl fumarate, methyl ethyl maleate, dibutyl maleate, dipropyl maleate, etc. or those compounds which form these compounds at reaction temperatures such as citric acid, for example. These substantially non-crosslinked substantially emulsifiable modified poly-α-olefin compositions have a melt viscosity of 250–5,000 centipoise at 190° C. and a saponification number of at least 6, preferably about 7–14.

One method for the determination of saponification number on maleated polypropylene is as follows: Weigh approximately 4 g. of the sample into a 500 ml. alkali-resistant Erlenmeyer flask and add 100 ml. distilled xylene. Heat under a reflux condenser for 1 hour. Cool the solution to 75° C. or less, and add from a buret 30 ml. standardized .10 N KOH in ethyl alcohol. Heat under reflux for 45 min. Cool, and add from a buret standardized .10 N CH₃COOH in xylene until the mixture is acid to phenolphthalein. Add at least 1 ml. excess CH₃COOH. Reheat the solution under reflux for 15 min. Remove from heat, add 5 ml. water, and titrate to a faint pink end point with .10 N KOH in ethyl alcohol. Run a blank in this manner using the same amounts of reagents and the same heating times. Calculation:

$$\frac{[(\text{ml. KOH} \times N) - (\text{ml. CH}_3\text{COOH} \times N)]_{\text{(for sample)}} - [(\text{ml. KOH} \times N) - (\text{ml. CH}_3\text{COOH} \times N)]_{\text{(for blank)}} \times 56.1}{\text{g. Sample}} = \frac{\text{Sap.}}{\text{No.}}$$

The modified poly-α-olefin is separated from the reaction mixture by first removing the unreacted, unsaturated polycarboxylic acid by purging the reaction mixture with the inert gas while the melt temperature is between 200 and 300° C. After the unreacted unsaturated polycarboxylic acid has been removed, the modified poly-α-olefin is recovered by vacuum stripping, solvent extraction, or aqueous medium and isolated by removing the solvent or water.

This invention can be further illustrated by the following examples of preferred embodiments thereof; although it will be understood that these examples are included merely for purposes of illustration and are not intended to limit the scope of the invention unless otherwise specifically indicated.

Example 1

A total of 250 g. of 90/10 propylene/1-butene copolymer having an I.V. of 1.9 was placed in a glass, round-bottomed flask. The flask was purged with dry nitrogen to remove air and it was carefully immersed in a Wood's metal bath maintained at 350° C. After the polymer melted, it was stirred and maintained at 350° C. for 1 hour. The flask was removed from the metal bath. After the polymer had cooled to 200° C., it was poured from the flask onto a metal tray. On cooling to about ambient temperature the hard brittle waxy material was easily granulated and has a melt viscosity of about 3,000 cp. at 190° C. and an inherent viscosity of .35.

Low viscosity polymers were also produced in the above manner from high-molecular-weight 50/50 propylene/1-butene copolymer, 95/5 propylene/1-pentene copolymer, 90/10 propylene/1-hexene copolymer, 80/20 propylene/4-methyl-1-pentene copolymer, 75/25 propylene/1-dodecene copolymer and 90/10 1-butene/1-hexene copolymer.

Example 2

A total of 125 g. of low-viscosity 90/10 propylene/1-butene copolymer having a melt viscosity of 3,000 cp. at 190° C. was placed in a glass, round-bottomed flask. The flask was flushed with dry nitrogen and carefully immersed in a metal bath maintained at 325° C. Molten maleic anhydride (6.25 g.) was gradually added over a 15-min. period with stirring. A steam condenser attached to one neck of the flask prevented the loss of maleic anhydride. The reaction mixture was stirred for an additional 30 min. at 325° C., then cooled to 200° C. and poured from the flask onto a metal tray. The light tan product had a melt viscosity of 975 cp. at 190° C. and an inherent viscosity of .22 and saponification number of 9.7.

Example 3

Low viscosity 50/50 propylene/1-butene copolymer having a melt viscosity of 3400 cp. at 190° C. was treated according to the general procedure of Example 2 except that citraconic anhydride (7.15 g.) was used instead of the maleic anhydride. The light tan product had a melt viscosity of 1200 cp. at 190° C. and an inherent viscosity of .24 and saponification number of 10.5.

Example 4

A total of 125 g. of low-viscosity 95/5 propylene/1-pentene copolymer having a melt viscosity of 4000 cp. at 190° C. and maleic acid (7.4 g.) were placed in a 300 ml. stainless steel rocking autoclave. After flushing it with dry nitrogen to remove air, the autoclave was heated at 325° C. with rocking for 30 min. The tan product had a melt viscosity of 1200 cp. at 190° C. and an inherent viscosity of .25 and saponification number of 7.8. Similar results were obtained using fumaric acid.

Example 5

Low viscosity 90/10 propylene/1-hexene copolymer having a melt viscosity of 3800 cp. at 190° C. was maleated according to the general procedure of Example 4 except that dimethyl maleate (9.2 g.) was used instead of maleic acid and the reaction was conducted for 1 hour. The white product had a melt viscosity of 850 cp. at 190° C. and an inherent viscosity of .20 and saponification number of 6.

Example 6

Low viscosity 80/20 propylene/4-methyl-1-pentene copolymer having a melt viscosity of 3500 cp. at 190° C. was maleated according to the general procedure of Example 4 except that dimethyl fumarate (10 g.) was used instead of the maleic acid. The white product had a melt viscosity of 1000 cp. at 190° C. and an inherent viscosity of .21 and saponification number of 6.2.

Example 7

Low viscosity 75/25 propylene/1-dodecene copolymer having a melt viscosity of 3750 cp. at 190° C. was maleated according to the general procedure of Example 4 except that the monomethyl ester of maleic acid (8.5 g.) was used instead of maleic acid. The tan product had a melt viscosity of 1300 cp. at 190° C. and an inherent viscosity of .23 and saponification number of 9.2.

Example 8

Low viscosity 90/10 1-butene/1-hexene copolymer having a melt viscosity of 4000 cp. at 190° C. was maleated with maleic anhydride according to the procedure of Example 2. The light tan product had a melt viscosity of 1500 cp. at 190° C. and an inherent viscosity of .27 and a saponification number of 10.3.

Example 9

About 250 grams of highly crystallizable high molecular weight polypropylene having a heptane index of greater than 95%, and an inherent viscosity of about 2.0 was placed in a glass, round bottomed flask. The flask was purged with dry nitrogen to remove air and it was carefully immersed in a Wood's metal bath maintained at 350° C. After the polymer melted, it was stirred and maintained at 350° C. for about 1 hour. The flask was removed from the metal bath. After the polymer had cooled to about 200° C., it was poured from the flask onto a metal tray. On cooling to about ambient temperature, the hard brittle waxy material was easily granulated and had a melt viscosity of about 3,300 centipoise at 190° C. and an inherent viscosity of about .42.

Low viscosity polymers were also produced in the above manner from high molecular weight poly-1-butene, poly-1-pentene, poly-1-hexene, poly-4-methyl-1-pentene and poly-1-dodecene.

Example 10

About 125 grams of low viscosity polypropylene of 3,300 centipoise at 190° C. was placed in a glass, round-bottom flask. The flask was flushed with dry nitrogen and carefully immersed in a metal bath maintained at 325° C. Molten maleic anhydride (6.25 g.) was gradually added over a 15-minute period with stirring. A steam condenser attached to one neck of the flask prevented the loss of maleic anhydride. The reaction mixture was stirred for an additional 30 minutes at 325° C., then cooled to about 200° C. and poured from the flask onto a metal tray. The waxy product had a melt viscosity of 900 centipoise at 190° C. and an inherent viscosity of .22.

As described hereinabove, this invention consists of a novel process and a new and novel modified poly-α-olefin polymeric composition which comprises thermally degrading high molecular weight crystallizable poly-α-olefins prepared from α-monomers having 3–12 carbon atoms having an intrinsic viscosity of 0.5 to about 7.0 or greater at a temperature of 290–425° C. to prepare a low molecular weight crystallizable poly-α-olefin material having an intrinsic viscosity of .2 to about .5 in the first step and then reacting the thermally degraded material with an unsaturated polycarboxylic acid, anhydride or ester thereof to prepare an emulsifiable modified poly-α-olefin having a melt viscosity of 250–5,000 centipoise at 190° C. and a saponification number of at least 6, preferably 7–12 in the second step.

The modified low molecular weight poly-α-olefin compositions of this invention are useful for many purposes including laminating aluminum foil to kraft paper, as modifiers to improve the adhesion properties of petroleum waxes, and as aqueous emulsions such as for example floor polishing compositions or textile treating compositions.

The invention has been described in considerable detail with particular reference to preferred embodiments thereof, but it will be understood that variations and modifications can be effected within the spirit and scope of the invention as described hereinabove and as defined in the appended claims.

I claim:

1. A process for the preparation of an emulsifiable low molecular weight modified poly-α-olefin which comprises thermally degrading in the absence of oxygen high molecular weight highly crystallizable poly-α-olefin polymer, said polymer having an inherent viscosity of about 0.5 to about 7.0 prepared from α-olefins having 3–12 carbon atoms, at a temperature of 290–425° C. to prepare a low molecular weight crystallizable poly-α-olefin having an inherent viscosity of about .2 to .5, and reacting said thermally degraded poly-α-olefin in the absence of oxygen or catalyst with a member of the group consisting of unsaturated polycarboxylic acids, unsaturated polycarboxylic acid anhydrides and unsaturated polycarboxylic acid esters at a temperature of 200 to 400° C. to produce a substantially non-crosslinked substantially emulsifiable modified poly-α-olefin having a saponification number of at least 6, a melt viscosity of 250–5,000 centipoise at 190° C. and an inherent viscosity of about .1 to about .4.

2. A process for the preparation of an emulsifiable low molecular weight modified poly-α-olefin composition which comprises thermally degrading in the absence of oxygen high molecular weight highly crystallizable homopolymeric compositions prepared from α-olefins having 3–12 carbon atoms and having an inherent viscosity of about 0.5 to about 7.0 at a temperature of 290–425° C. to produce a low molecular weight crystallizable poly-α-olefin having an inherent viscosity of about .2 to about .5, and reacting said thermally degraded poly-α-olefin in the absence of oxygen or catalyst with a member of the group consisting of unsaturated polycarboxylic acids, unsaturated polycarboxylic acid anhydrides and unsaturated polycarboxylic acid esters at a temperature of 200 to 400° C. to produce a substantially emulsifiable modified poly-α-olefin having a saponification number of at least 6, a melt viscosity of 250–5,000 centipoise at 190° C. and an inherent viscosity of about .1 to about .4.

3. A process for the preparation of an emulsifiable low molecular weight modified poly-α-olefin composition which comprises thermally degrading in the absence of oxygen high molecular weight highly crystallizable copolymeric compositions prepared from α-olefins having 3–12 carbon atoms and having an inherent viscosity of about 0.5 to about 7.0 at a temperature of 290–425° C. to produce a low molecular weight crystallizable thermally degraded poly-α-olefin having an inherent viscosity of about .2 to about .5, and reacting said thermally degraded poly-α-olefin in the absence of oxygen or catalyst with a member of the group consisting of unsaturated polycarboxylic acids, unsaturated polycarboxylic acid anhydrides and unsaturated polycarboxylic acid esters at a temperature of 200 to 400° C. to produce a substantially non-crosslinked substantially emulsifiable modified poly-α-olefin having a saponification number of at least 6, a melt viscosity of 250–5,000 centipoise at 190° C. and an inherent viscosity of about .1 to about .4.

4. A process for the preparation of an emulsifiable low molecular weight modified polypropylene composition which comprises thermally degrading in the absence of oxygen high molecular weight highly crystallizable polypropylene having an inherent viscosity of about 0.5 to about 7.0 at a temperature of 290–425° C. to prepare a low molecular weight crystallizable thermally degraded polypropylene having an inherent viscosity of about .2 to about .5, and reacting said thermally degraded polypropylene in the absence of oxygen or catalyst with a member of the group consisting of unsaturated polycarboxylic acids, unsaturated polycarboxylic acid anhydrides and unsaturated polycarboxylic acid esters at a temperature of about 200 to 400° C. to produce a substantially emulsifiable modified poly-α-olefin having a saponification number of at least 6, a melt viscosity of 250–5,000 centipoise at 190° C. and an inherent viscosity of about .1 to about .4.

5. A process for the preparation of an emulsifiable low molecular weight propylene/butene-1 composition which comprises thermally degrading in the absence of oxygen high molecular weight highly crystallizable propylene/butene-1 copolymer having an inherent viscosity of about 0.5 to about 7.0 at a temperature of 290–425° C. to prepare a low molecular weight crystallizable thermally degraded propylene/butene-1 composition having an inherent viscosity of about .2 to about .5, and reacting said thermally degraded propylene/butene-1 composition in the absence of oxygen or catalyst with a member of the group consisting of unsaturated polycarboxylic acids, unsaturated polycarboxylic acid anhydrides and unsaturated polycarboxylic acid esters at a temperature of about 200–400° C. to produce a substantially non-crosslinked substantially emulsifiable modified propylene/butene-1 composition having a saponification number of at least 6, a melt viscosity of 250–5,000 centipoise at 190° C. and an inherent viscosity of about .1 to about .4.

6. An emulsifiable low molecular weight crystallizable modified polypropylene composition prepared by reacting a thermally modified poly-α-olefin composition according to the process of claim 4.

7. An emulsifiable low molecular weight crystallizable modified propylene/butene-1 copolymer composition prepared by reacting a thermally modified poly-α-olefin composition according to the process of claim 6.

8. A process for the preparation of an emulsifiable low molecular weight crystallizable modified poly-α-olefin composition which comprises reacting in the absence of oxygen or catalyst a thermally degraded poly-α-olefin having an inherent viscosity of about .2 to about .5 prepared by thermally degrading at a temperature of 290–425° C. in the absence of oxygen high molecular weight highly crystallizable poly-α-olefin polymer having an inherent viscosity of about 0.5 to about 7.0 prepared from α-olefins having 3–12 carbon atoms with a member of the group consisting of unsaturated polycarboxylic acids, unsaturated polycarboxylic acid anhydrides and unsaturated polycarboxylic acid esters to produce a substantially non-crosslinked substantially emulsifiable modified poly-α-olefin having a saponification number of at least 6, a melt viscosity of 250–5,000 centipoise at 190° C. and an inherent viscosity of about .1 to about .4.

9. A process for the preparation of an emulsifiable low molecular weight crystallizable modified homopolymeric composition which comprises reacting in the absence of oxygen or catalyst a thermally degraded homopolymeric poly-α-olefin having an inherent viscosity of about .2 to about .5 prepared by thermally degrading at a temperature of 290–425° C. in the absence of oxygen high molecular weight highly crystallizable homopolymeric poly-α-olefin having an inherent viscosity of about 0.5 to about 7.0 prepared from α-olefins having 3–12 carbon atoms with a member of the group consisting of unsaturated polycarboxylic acids, unsaturated polycarboxylic acid anhydrides and unsaturated polycarboxylic acid esters to produce a substantially non-cross-linked substantially emulsifiable modified poly-α-olefin having a saponification number of at least 6, a melt viscosity of 250–5,000 centipoise at 190° C. and an inherent viscosity of about .1 to about .4.

10. A process for the preparation of an emulsifiable low molecular weight crystallizable copolymeric composition which comprises reacting in the absence of oxygen or a catalyst a thermally degraded copolymeric poly-α-olefin having an inherent viscosity of about .2 to about .5 prepared by thermally degrading at a temperature of 290–425° C. in the absence of oxygen high molecular weight highly crystallizable copolymeric poly-α-olefin having an inherent viscosity of about 0.5 to about 7.0 prepared from α-olefins having 3–12 carbon atoms with a member of the group consisting of unsaturated polycarboxylic acids, unsaturated polycarboxylic acid anhydrides and unsaturated polycarboxylic acid esters to produce a substantially non-cross-linked substantially emulsifiable modified polymer having a saponification number of at least 6, a melt viscosity of 250–5,000 centpoise at 190° C. and an inherent viscosity of about .1 to about .4.

11. A process for the preparation of an emulsifiable low molecular weight crystallizable polypropylene composition which comprises reacting in the absence of oxygen or a catalyst a thermally degraded polypropylene having an inherent viscosity of 0.2 to about 0.5 prepared by thermally degrading at a temperature of 290–425° C. in the absence of oxygen high molecular weight highly crystallizable polypropylene having an inherent viscosity of about 0.5 to about 7.0 prepared from α-olefins having 3–12 carbon atoms with a member of the group consisting of unsaturated polycarboxylic acids, unsaturated polycarboxylic acid anhydrides and unsaturated polycarboxylic acid esters to produce a substantially non-crosslinked substantially emulsifiable modified polymer having a saponification number of at least 6, a melt viscosity of 250–5,000 centipoise at 190° C. and an inherent viscosity of about .1 to about .4.

12. A process for the preparation of an emulsifiable low molecular weight crystallizable propylene/butene-1 copolymer composition which comprises reacting in the absence of oxygen or a catalyst a thermally degraded propylene/butene-1 copolymer prepared by thermally degrading at a temperature of 290–425° C. in the absence of oxygen high molecular weight highly crystallizable propylene/butene-1 having an inherent viscosity of about 0.5 to about 7.0 prepared from α-olefins having 3–12 carbon atoms having an inherent viscosity of 0.2 to about 0.5 with a member of the group consisting of unsaturated polycarboxylic acids, unsaturated polycarboxylic acid anhydrides and unsaturated polycarboxylic acid esters to produce a substantially non-crosslinked substantially emulsifiable modified polymer having a saponification number of at least 6, a melt viscosity of 250–5,000 centipoise at 190° C. and an inherent viscosity of about .1 to about .4.

13. An emulsifiable low molecular weight modified poly-α-olefin prepared by reacting a thermally degraded poly-α-olefin composition according to the process of claim 8.

14. An emulsifiable low molecular weight modified poly-α-olefin prepared by reacting a thermally degraded poly-α-olefin composition according to the process of claim 9.

15. An emulsifiable low molecular weight modified poly-α-olefin prepared by reacting a thermally degraded poly-α-olefin composition according to the process of claim 10.

References Cited

UNITED STATES PATENTS

| | | | |
|---|---|---|---|
| 2,634,256 | 4/1953 | Sparks et al. | 260—78.4 |
| 2,928,816 | 3/1960 | Chapman et al. | 260—94.9 |
| 2,973,344 | 2/1961 | Fasce | 260—78.4 |
| 3,155,644 | 11/1964 | Kehr | 260—94.9 |
| 3,201,381 | 8/1965 | Hagemeyer et al. | 260—94.9 |
| 3,342,771 | 9/1967 | Cheritat et al. | 260—41 |
| 2,766,214 | 10/1956 | Erchak et al. | 260—29.6 |

JOSEPH L. SCHOFER, Primary Examiner

C. H. HENDERSON, Jr., Assistant Examiner

U.S. Cl. X.R.

106—3; 117—139.5; 161—216, 250, 235, 247; 260—88.2, 93.7

PO-1050
(5/69)

UNITED STATES PATENT OFFICE
CERTIFICATE OF CORRECTION

Patent No. 3,481,910      Dated December 2, 1969

Inventor(s) Marion O. Brunson

It is certified that error appears in the above-identified patent and that said Letters Patent are hereby corrected as shown below:

Column 7, lines 24-25 should read ---
temperature of about 200 to 400°C. to produce a substantially non-crosslinked substantially emulsifiable modified poly-α-olefin having a---.
    Column 7, line 55, "6" should read ---5---.

SIGNED AND
SEALED
SEP 15 1970

(SEAL)
Attest:

Edward M. Fletcher, Jr.
Attesting Officer

WILLIAM E. SCHUYLER, JR.
Commissioner of Patents